United States Patent

Espax

(10) Patent No.: US 7,839,957 B2
(45) Date of Patent: Nov. 23, 2010

(54) MULTIPATH SEARCH METHOD AND APPARATUS

(75) Inventor: Francesc Boixadera Espax, Cambridge (GB)

(73) Assignees: MStar Semiconductor, Inc. (KY); MStar Software R&D (Shenzhen) Ltd., Shenzhen (CN); MStar France SAS, Issy les Moulineaux (FR); MStar Semiconductor, Inc. (TW)

( * ) Notice: Subject to any disclaimer, the term of this patent is extended or adjusted under 35 U.S.C. 154(b) by 722 days.

(21) Appl. No.: 11/596,430

(22) PCT Filed: May 11, 2005

(86) PCT No.: PCT/GB2005/001798

§ 371 (c)(1),
(2), (4) Date: Nov. 13, 2006

(87) PCT Pub. No.: WO2005/109663

PCT Pub. Date: Nov. 17, 2005

(65) Prior Publication Data

US 2007/0177657 A1    Aug. 2, 2007

(30) Foreign Application Priority Data

May 12, 2004    (GB)    .................. 0410617.5

(51) Int. Cl.
*H04B 7/10*    (2006.01)
(52) U.S. Cl. .................. 375/347; 375/346; 375/316; 455/132; 455/296
(58) Field of Classification Search .................. 375/347, 375/260
See application file for complete search history.

(56) References Cited

U.S. PATENT DOCUMENTS

| 5,684,793 | A | * | 11/1997 | Kiema et al. ............... 370/335 |
| 5,936,999 | A | | 8/1999 | Keskitalo |
| 5,968,198 | A | * | 10/1999 | Hassan et al. ............... 714/752 |
| 6,111,910 | A | * | 8/2000 | Cui et al. .................... 375/142 |
| 6,157,820 | A | * | 12/2000 | Sourour et al. ........... 455/226.2 |
| 6,167,037 | A | * | 12/2000 | Higuchi et al. ............. 370/335 |
| 6,563,886 | B1 | * | 5/2003 | Kubo et al. ................. 375/326 |
| 6,580,750 | B2 | * | 6/2003 | Aue ............................ 375/150 |
| 6,665,282 | B1 | | 12/2003 | Eriksson et al. |
| 6,748,009 | B2 | * | 6/2004 | Reznik et al. .............. 375/147 |
| 6,779,162 | B2 | * | 8/2004 | Barrick et al. ................. 716/6 |

(Continued)

FOREIGN PATENT DOCUMENTS

EP    1126627    8/2001

(Continued)

OTHER PUBLICATIONS

European Search Report dated Aug. 18, 2005.

(Continued)

*Primary Examiner*—Chieh M Fan
*Assistant Examiner*—Santiago Garcia
(74) *Attorney, Agent, or Firm*—Edell, Shapiro & Finnan, LLC

(57) ABSTRACT

A method of updating a multipath search that has located one or more multipath component peaks in a received signal, the method comprising repeating the search using a delay spread window extending either back from the latest peak or forward from the earliest peak.

15 Claims, 2 Drawing Sheets

U.S. PATENT DOCUMENTS

| | | | |
|---|---|---|---|
| 6,993,101 B2* | 1/2006 | Trachewsky et al. | 375/343 |
| 7,012,977 B2* | 3/2006 | Madkour et al. | 375/346 |
| 7,068,709 B2* | 6/2006 | Hasegawa | 375/150 |
| 7,072,428 B2* | 7/2006 | Niva et al. | 375/348 |
| 7,082,109 B2* | 7/2006 | Lundby et al. | 370/311 |
| 7,224,719 B1* | 5/2007 | Hughes et al. | 375/147 |
| 7,292,609 B2* | 11/2007 | Oura | 370/519 |
| 7,376,206 B1* | 5/2008 | Simic et al. | 375/329 |
| 7,388,853 B2* | 6/2008 | Ptasinski et al. | 370/338 |
| 7,406,106 B2* | 7/2008 | Mallory | 370/522 |
| 7,542,411 B1* | 6/2009 | Goh et al. | 370/208 |
| 2001/0030990 A1* | 10/2001 | Rouphael et al. | 375/142 |
| 2001/0046221 A1* | 11/2001 | Ostman et al. | 370/335 |
| 2002/0064213 A1* | 5/2002 | Hasegawa | 375/150 |
| 2002/0085623 A1* | 7/2002 | Madkour et al. | 375/148 |
| 2002/0105919 A1* | 8/2002 | Lundby et al. | 370/311 |
| 2004/0229617 A1* | 11/2004 | Sato | 455/437 |
| 2004/0250049 A1* | 12/2004 | Becker et al. | 712/35 |
| 2005/0078639 A1* | 4/2005 | Oura | 370/335 |
| 2006/0188005 A1* | 8/2006 | Espax | 375/148 |
| 2009/0115479 A1* | 5/2009 | Gomm et al. | 327/161 |

FOREIGN PATENT DOCUMENTS

| | | |
|---|---|---|
| EP | 1164383 A2 | 12/2001 |
| EP | 1209816 A2 | 5/2002 |
| EP | 1286475 | 2/2003 |
| EP | 1209816 A3 | 9/2004 |
| GB | 2398465 A | 8/2004 |
| WO | WO 02/29994 A2 | 4/2002 |

OTHER PUBLICATIONS

Great Britain Search Report dated Jun. 11, 2003.

* cited by examiner

MULTIPATH SEARCH METHOD AND APPARATUS

FIELD OF THE INVENTION

The invention relates to methods and apparatus for updating the search time window for multipath searches.

BACKGROUND OF THE INVENTION

In the mobile radio telecommunications field, it is widely understood that a wireless signal will often propagate between a transmitter and a receiver via several paths. The components arriving at the receiver via different paths are commonly referred to as multipath components and they may interfere with one another at the receiver leading to a degradation of the receiver's performance.

Various schemes exist for addressing the problem of multipath propagation. Often, these techniques rely on a determination of the relative time offsets between multipath components or, in other words, some measure of the difference in the propagation time for the signals travelling along the different paths. Often, the process of determining the existence of signal components arriving at a receiver via different paths and the time offsets between them is called a multipath search. Typically, the number of, and relative delays between, such components will vary over time, as will the amplitude and phase of each such component.

SUMMARY OF THE INVENTION

One aim of the invention is to provide a scheme for updating a multipath search.

According to one aspect, the invention provides a method of updating a multipath search that has located one or more multipath component peaks in a received signal by correlating the received signal against a known signal at various time offsets between the two signals, wherein the or each peak appears at a respective time offset and the method comprises performing an updating search for multipath component peaks in the signal by correlating the known signal against the received signal over a range of time offsets, wherein the range extends either in a first manner from the smallest time offset that produced a peak in the search to be updated in the direction of increasing time offset or in a second manner from the greatest time offset that produced a peak in the search to be updated in the direction of decreasing time offset.

The invention also consists in apparatus for updating a multipath search that has located one or more multipath component peaks in a received signal by correlating the received signal against a known signal at various time offsets between the two signals, wherein the or each peak appears at a respective time offset and the apparatus comprises processing means for performing an updating search for multipath component peaks in the signal by correlating the known signal against the received signal over a range of time offsets, wherein the range extends either in a first manner from the smallest time offset that produced a peak in the search to be updated in the direction of increasing time offset or in a second manner from the greatest time offset that produced a peak in the search to be updated in the direction of decreasing time offset.

According to another aspect, the invention provides a method of updating a multipath search that has located one or more multipath component peaks in a received signal, the method comprising repeating the search using a delay spread window extending either back from the latest peak or forward from the earliest peak.

The invention also consists in apparatus for updating a multipath search that has located one or more multipath component peaks in a received signal, the apparatus comprising processing means for repeating the search using a delay spread window extending either back from the latest peak or forward from the earliest peak.

In a preferred embodiment, several such updating searches are performed in series. Preferably, consecutive searches in the series are performed in opposite senses. That is to say, for any pair of updating searches in the series, one is performed in a manner which extends backwards from the latest known multipath component peak and the other is performed forwards from the earliest known multipath component peak. The extent of the search, in terms of delay spread, may be varied from search to search in the series.

The invention is preferably used in a participant of a wireless communications network, such as a mobile telephone. The invention may also be implemented as software for execution by a suitable data processing device, or as a combination of both hardware and software.

BRIEF DESCRIPTION OF THE DRAWINGS

By way of example only, an embodiment of the invention will now be described with reference to the accompanying figures, in which.

DETAILED DESCRIPTION

Figure 1:
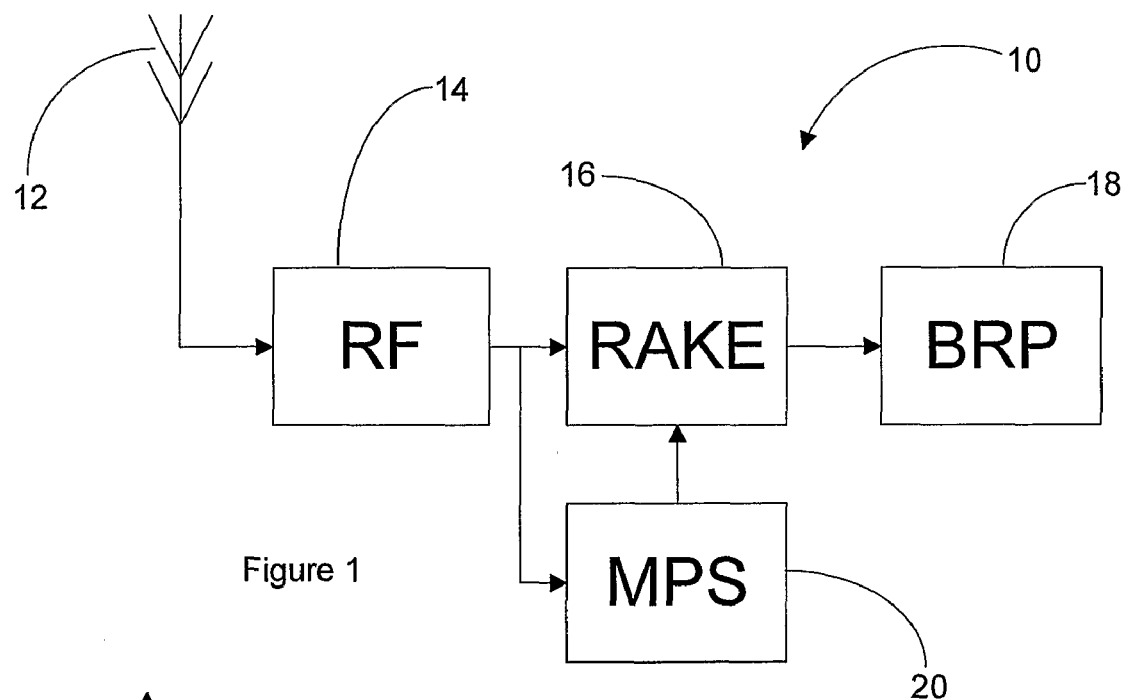
FIG. 1 is a block diagram of a mobile telephone.

FIG. 1 shows some basic elements of a mobile telephone 10 for a UMTS network. FIG. 1 illustrates only the elements of the telephone 10 that are most useful for describing the invention; it will be apparent to the skilled person that the construction of the mobile telephone will be far more complex in practice. As shown in FIG. 1, the telephone 10 includes an antenna 12, an RF section 14, a rake receiver 16 a bit rate processor (BRP) 18 and a multipath searcher (AS) 20.

The telephone 10 receives signals through antenna 12. The received signals are downconverted by the RF section 14 to produce a baseband signal. The baseband signal is then passed to both the rake receiver 16 and the multipath searcher 20. The multipath searcher 20 identifies the strongest group of multipath components in the baseband signal and allocates a finger of the rake receiver 16 to each of those components. The rake receiver 16 demodulates the allocated multipath components in parallel and combines the results in a time-aligned manner. The demodulated signal provided by the rake receiver 16 is then supplied to the BRP 18 for further processing. In the example of a voice call, the further processing performed by the BRP 18, includes the extraction of speech information from the received signal and its ultimate conversion into an analogue signal for presentation to the user via a sound transducer. No further detail will be given about the operation of the RF section, the rake receiver 16 or the BRP 18 since the manner in which these units function will be readily understood by the skilled person. However, the operation of the MPS 20 will now be described in greater detail.

In the process of interacting with a basestation, the telephone 10 will monitor a signal sent out by a basestation in a common pilot channel (CPICH) of the UMTS network in which the telephone 10 is participating. The signal transmitted by the basestation in the CPICH is encoded using a scrambling code and that scrambling code is known to, or deduced by, the telephone 10. The MPS 20 performs measurements on the signal acquired from the basestation in the CPICH in order to identify the multipath components arriving from the basestation.

The MPS 20 performs a set of correlation calculations on the CPICH signal acquired by the telephone 10 from the basestation. Each of the correlation calculations involves the correlation of the scrambling code with the CPICH signal from the basestation to produce a correlation value. However, each of the correlation calculations uses a different time offset between the scrambling code and the CPICH signal from the basestation. If one plots the correlation values against their time offset values, then the resulting curve will show a number of peaks, one peak for each of the multipath components of the signal sent by the basestation in the CPICH. (In practice, only the strongest multipath components will be discernible against the noise floor.) The heights of the peaks indicate the relative power levels of the multipath components that are present and the spacing between the peaks indicates the relative delays between the various multipath components. For this reason, it is usual to refer to such a plot as a power versus delay profile.

Figure 2:
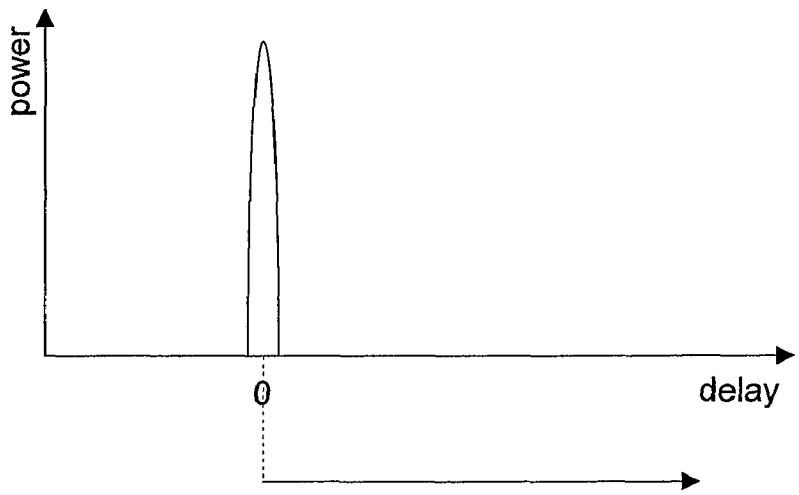
FIG. 2 shows the result of a multipath search performed in the telephone of FIG. 1.

Upon first detecting CPICH transmissions from the basestation, the MPS 20 performs a set of coarse correlation calculations that are sufficient to provide a power versus delay profile in which the strongest multipath component peak can be discerned. Such a plot is shown in FIG. 2. The MPS 20 will repeat this coarse evaluation at intervals. Alternatively, coarse path position may also be obtained through other means such as correlation against synchronisation codes (e.g. for UMTS these are P-SCH, S-SCH). If, however, the telephone 10 starts to actively use the base station, e.g. as the result of a handover, then the MPS 20 performs a finer set of correlation calculations to produce a more detailed version of the power versus delay profile.

The UMTS standards presently state that multipath components must be monitored over at least a 20 μs window or delay spread of the power versus delay profile of a basestation that is actively being used. Therefore, the MPS 20 designates the location of the strongest peak found in the last iteration of the coarse search as the zero point on the delay axis and performs the correlation calculations that are needed to build up a detailed power versus delay profile over the interval 0 μs to 20 μs on the delay axis, as indicated by the arrow below the delay axis in FIG. 2.

Figure 3:
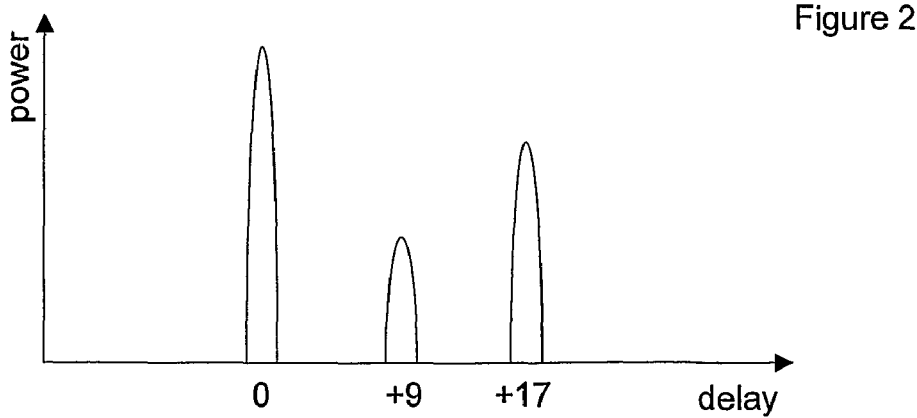
FIG. 3 shows the result of a multipath search performed in the telephone of FIG. 1.
Figure 4:
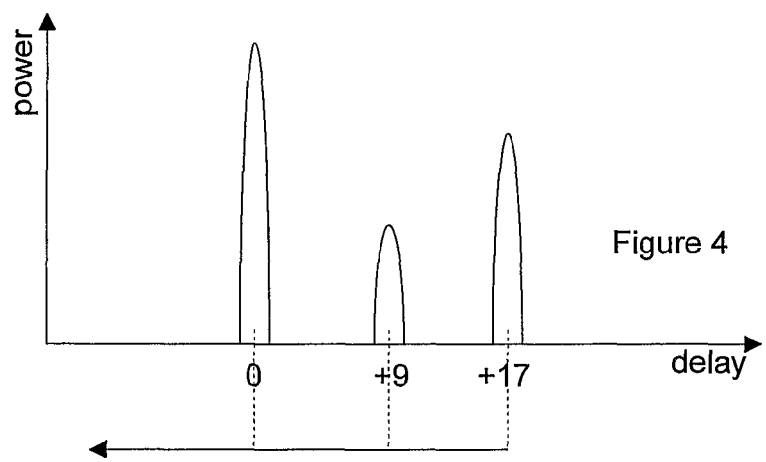
FIG. 4 shows the result of a multipath search performed in the telephone of FIG. 1.
Figure 5:
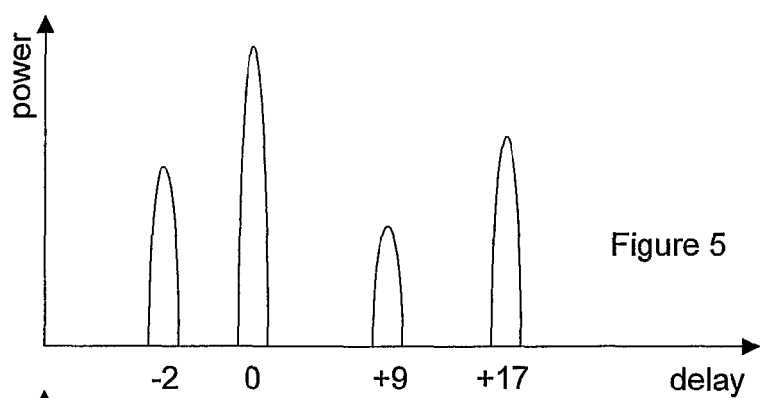
FIG. 5 shows the result of a multipath search performed in the telephone of FIG. 1.

In this example, the detailed search finds additional multipath components at delays of +9 μs and +17 μs on the delay axis as shown in FIG. 3. The MPS 20 is required to repeat the detailed 20 μs search periodically on the assumption that the multipath environment around the telephone 10 will change from time to time. However, at the next iteration of the detailed search, the 20 μs window is linked to the latest peak located in the previous search, in this case the peak at +17 μs, and extends in the direction of decreasing delay, as indicated by the arrow below the delay axis in FIG. 4. Thus, the search is now performed over the interval +17 μs to −3 μs on the delay axis. In this example, the new search finds the peaks at 0, +9 and +17 μs once more but also locates an additional peak at −2 μs, as indicated in FIG. 5.

Figure 6:
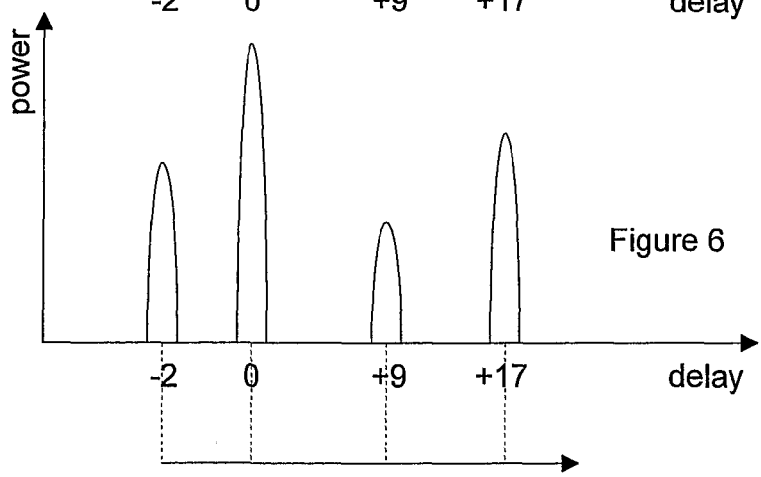
FIG. 6 shows the result of a multipath search performed in the telephone of FIG. 1.
Figure 7:
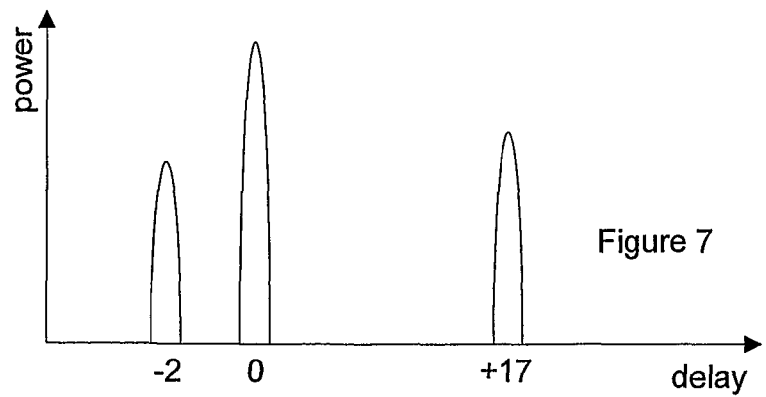
FIG. 7 shows the result of a multipath search performed in the telephone of FIG. 1.

When the time comes to perform the next iteration of the detailed search, the 20 μs window is linked to the earliest peak on the delay axis and extends forwards in the direction of increasing delay, as indicated by the arrow below the delay axis in FIG. 6. In this example, the new iteration of the search finds peaks at −2, 0 and +17 μs but the peak at +9 μs no longer exists.

The detailed 20 μs search is repeated periodically as long as the telephone 10 continues to actively use the basestation in question. Consecutive iterations of the search continue to extend in opposite senses, that is towards increasing delay or towards decreasing delay. Each iteration that extends in the direction of decreasing delay begins at the latest peak found by the previous iteration of the search and each iteration that extends in the direction of increasing delay begins at the earliest peak found by the previous iteration of the search. Thus, a 20 μs range of the power versus delay profile is monitored in a manner which places a relatively light burden on the data processing resources of the telephone in terms of the number of correlation calculations that need to be performed. The MPS 20 provides a particular benefit in the case where the search to be updated contains just a single multipath peak in that paths upto 20 μs away can be located without the penalty of having to search through a 40 μs time window in a single iteration of the search.

The invention claimed is:

1. A method of updating a multipath search that has located one or more multipath component peaks in a received signal by correlating a present received signal against a known signal at various time offsets between the two signals, wherein the or each peak appears at a respective time offset and the method comprises periodically performing a present updating search for multipath component peaks in the present received signal by correlating the known signal against the present received signal over a fixed range of time offsets, wherein the fixed range extends alternately in a first manner from the smallest time offset that produced a peak in a previous updating search to be updated in the direction of increasing time offset and in a second manner from the greatest time offset that produced a peak in the previous updating search to be updated in the direction of decreasing time offset, wherein the present updating search is used for the present received signal and the previous updating search is used for the previous received signal.

2. A method according to claim 1, wherein the method further comprises periodically performing at least one more updating search for multipath component peaks in a successive signal by correlating the successive received signal against the known signal over a fixed range of time offsets, wherein the fixed range extends alternatively in said first manner and said second manner.

3. A method according to claim 1, further comprising an original search before the step of periodically performing the present updating search that is a coarse search which locates just the strongest multipath component peak.

4. A method of updating a multipath search that has located one or more multipath component peaks in a present received signal, wherein the or each peak appears at a respective time offset, the method comprising periodically performing a present search for multipath component peaks by correlating a known signal against the present received signal over a fixed range of time offsets, wherein the fixed range extends alternately in a first manner from the smallest time offset that produced a peak in a previous updating search to be updated in the direction of increasing time offset or and in a second manner from the greatest time offset that produced a peak in the previous updating search to be updated in the direction of decreasing time offset, wherein the present search is used for the present received signal and the previous search is used for the previous received signal.

5. A method according to claim 4, further comprising repeating said search at least one further time using a delay spread window extending alternatively back from the latest peak of the previous search and forward from the earliest peak of the previous search.

6. A method according to claim 4, further comprising an original search before the step of periodically performing the present updating search that is a coarse search which locates just the strongest multipath component peak.

7. Apparatus for updating a multipath search that has located one or more multipath component peaks in a received signal by correlating a present received signal against a known signal at various time offsets between the two signals, wherein the or each peak appears at a respective time offset and the apparatus comprises a processor arranged to periodically perform a present updating search for multipath component peaks in the present received signal by correlating the known signal against the present received signal over a fixed range of time offsets, wherein the range extends alternately in a first manner from the smallest time offset that produced a peak in a previous updating search to be updated in the direction of increasing time offset and in a second manner from the greatest time offset that produced a peak in the previous updating search to be updated in the direction of decreasing time offset, wherein the present updating search is used for the present received signal and the previous updating search is used for the previous received signal.

8. Apparatus according to claim 7, wherein the processor is further arranged to periodically perform at least one more updating search for multipath component peaks in a successive signal by correlating the known signal against the successive received signal over a fixed range of time offsets, wherein the fixed range extends alternatively in said first manner and said second manner.

9. Apparatus according to claim 7, wherein the processor if further arranged to perform an original search before periodically performing the present updating search that is a coarse search which locates just the strongest multipath component peak.

10. Apparatus for updating a multipath search that has located one or more multipath component peaks in a present received signal, wherein the or each peak appears at a respective time offset, the apparatus comprising a processor for performing a present search using a respective time offset, and periodically performing a present search for multipath component peaks by correlating a known signal against the present received signal over a fixed range of time offsets, wherein the fixed range extends alternately in a first manner from the smallest time offset that produced a peak in a previous updating search to be updated in the direction of increasing time offset and in a second manner from the greatest time offset that produced a peak in the previous updating search to be updated in the direction of decreasing time offset, wherein the present search is used for the present received signal and the previous search is used for the previous received signal.

11. Apparatus according to claim 10, wherein the processor is further arranged to repeat the present updating search at least one further time, with the delay spread window extending in opposite directions in at least one pair of consecutive iterations of the present updating search.

12. Apparatus according to claim 10, wherein the processor is further arranged to perform an original search that is a coarse search which locates just the strongest multipath component peak.

13. A radio telecommunications device including an apparatus for updating a multipath search that has located one or more multipath component peaks in a received signal by correlating a present received signal against a known signal at various time offsets between the two signals, wherein the or each peak appears at a respective time offset and the apparatus comprises a processor arranged to periodically perform a present updating search for multipath component peaks in the present received signal by correlating the known signal against the present received signal over a fixed range of time offsets, wherein the fixed range extends alternately in a first manner from the smallest time offset that produced a peak in a previous updating search to be updated in the direction of increasing time offset and in a second manner from the greatest time offset that produced a peak in the previous updating search to be updated in the direction of decreasing time offset, wherein the present updating search is used for the present received signal and the previous updating search is used for the previous received signal.

14. A radio telecommunications device including apparatus for updating a multipath search that has located one or more multipath component peaks in a present received signal, wherein the or each peak appears at a respective time offset, the apparatus comprising a processor for performing a present search using a respective time offset, and periodically performing a present search for multipath component peaks by correlating a known signal against the present received signal over a fixed range of time offsets, wherein the fixed range extends alternately in a first manner from the smallest time offset that produced a peak in a previous updating search to be updated in the direction of increasing time offset OF and in a second manner from the greatest time offset that produced a peak in the previous updating search to be updated in the direction of decreasing time offset, wherein the present search is used for the present received signal and the previous search is used for the previous received signal.

15. A method of updating a multipath search, that has located one or more multipath component peaks in a received signal, wherein the or each peak appears at a respective time offset, the method comprising performing a present search using a respective time offset, and periodically performing a present search for multipath component peaks by correlating a known signal against the present received signal over a fixed range of time offsets, wherein the fixed range extends alternately in a first manner from the smallest time offset that produced a peak in a previous updating search to be updated in the direction of increasing time offset and in a second manner from the greatest time offset that produced a peak in the previous updating search to be updated in the direction of decreasing time offset, wherein the present search is used for the present received signal and the previous search is used for the previous received signal.

* * * * *